UNITED STATES PATENT OFFICE.

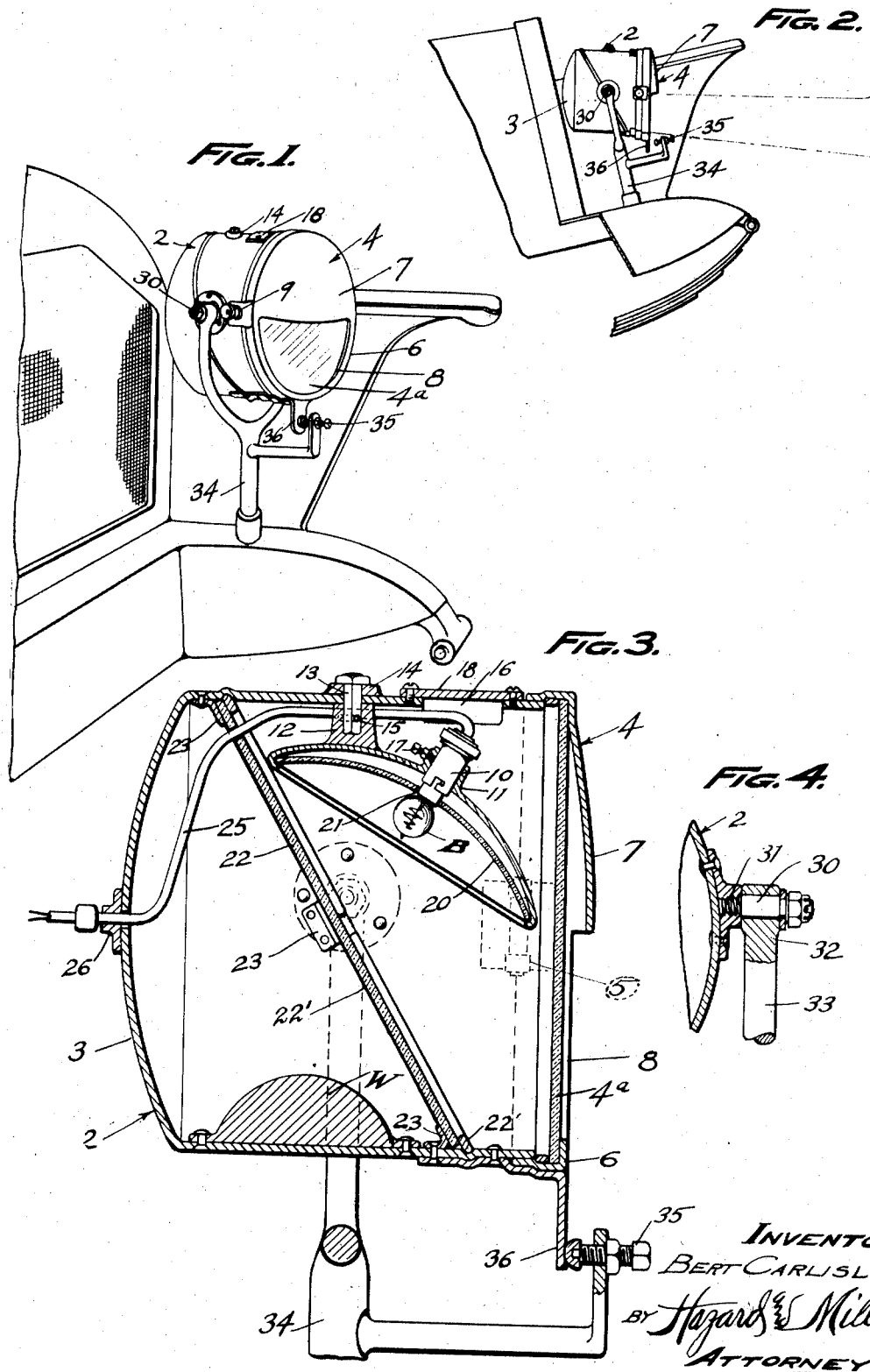

BERT CARLISLE, OF SANTA ANA, CALIFORNIA.

HEADLIGHT FOR AUTOMOBILES.

1,366,117. Specification of Letters Patent. Patented Jan. 18, 1921.

Application filed November 7, 1919. Serial No. 336,390.

*To all whom it may concern:*

Be it known that I, BERT CARLISLE, a citizen of the United States, residing at Santa Ana, in the county of Orange and State of California, have invented new and useful Improvements in Headlights for Automobiles, of which the following is a specification.

This invention relates to illumination and more particularly to headlights for road vehicles, and has for its object to provide a light that will comply with the present regulations and ordinances requiring that the glare of the headlights of vehicles be eliminated and that the light be projected at not more than a certain elevation in front of the vehicle so as not to blind observers in front of the vehicle.

A further object of the invention is to provide a headlight that will automatically swing with respect to the vehicle as the latter rises on an incline so that the rays of the light will be directed immediately into the foreground and yet when the vehicle reaches the summit of an incline the lamp will automatically resume a limited position to prevent the light rays from being projected upwardly above the normal running plane and will, therefore, automatically assume the position required by rules and regulations of the road; and with these and other objects in view, the invention consists of the construction and features as illustrated in the accompanying drawings and described and claimed hereinafter.

Figure 1 is a perspective of a portion of the front end of an automobile showing the improved headlight applied and in the normal operating position.

Fig. 2 is a side elevation of the front portion of the vehicle showing the latter as ascending an incline and indicating the position assumed by the headlight at such time.

Fig. 3 is a central, vertical, longitudinal section through the improved lamp.

Fig. 4 is a detail sectional view of a lamp pivot.

Road laws and regulations now obtaining in various jurisdictions forbid the use of headlights on road vehicles when the headlights are of such a power, or are so constructed, as to cast a blinding glare ahead, and these laws forbid the use of headlights in which the rays are projected upwardly so as to be dangerous beyond a given distance in advance of the vehicle, and to provide a lamp that will comply with the regulations I have evolved a headlight comprising a casing 2 which may be of any suitable form of construction and of suitable proportions and as here shown is of cylindrical form and is provided with a closed rear end 3 and its front end is open and is provided with a cover 4 which is hinged to one side of the casing, as shown in dotted lines at 5, the cover including a ring or annulus 6 overlapping the open end of the cylindrical casing 2. This cover, preferably, has a downwardly extending hood-like portion 7 covering substantially one-half of the area of the opening of the headlight, the lower half of the cover being open as indicated at 8 to permit the emanation of rays of light from the source of illumination as the bulb B mounted inside of the casing. Any suitable latch may be utilized to hold the cover 4 in its closed position such latch being shown as at 9, Fig. 1.

One of the important features of my present invention resides in the peculiar construction and arrangement of the means for reflecting the light from the bulb and in the location of the bulb B so as to prevent the upward reflection of any of the rays of light through the opening 8 of the cover 4 and to secure a general forward and downward reflection of these rays so as not only to fully comply with the rules and regulations made and provided, but also so as to secure the maximum efficiency of the light upon the roadway to a suitable distance in front of the vehicle.

To that end I have shown the bulb B as mounted in a socket 10 that may be adjusted in the bearing plate 11 which is shown as disposed obliquely across the upper and front portion of the casing 2; this bearing plate 11 being provided with suitable means for connecting it to the top of the casing 2. One form of connecting means includes a socket or hub 12 extending upwardly from one side of the bearing plate 11 this socket being adapted to receive a pin 13 which is shown as polygonal in cross section and as passed through a boss 14 in the top of the casing 2.

The bearing plate 11 is inserted into the casing to its proper position while the cover 6 is open and then the pin 13 is inserted in the socket 12, these parts co-acting to prevent the swiveling or change of position of the bearing plate 11, and the pin may be keyed or otherwise fastened in the socket as by a key 15. To secure the proper focusing of the lamp bulb B in the casing, the latter is provided with a handhole 16 into which the fingers of a hand may be inserted to properly set the socket 10 in the bearing plate 11 and thereafter the socket 10 be clamped as by a set screw 17. The handhole 16 may be covered or closed by a cover plate 18.

The rays of light coming from the bulb B can be collected either by forming the inner face of the bearing plate 11 with a reflecting surface or a reflector 20 may be mounted upon the annular ring of the bearing plate 11, the reflector having a central hole 21 to receive the contact sleeve of the bulb B.

For the purpose of directing the rays of light coming from the bulb and the reflector 20 forwardly and downwardly, there is arranged in a position in the rear of the bulb a reflector 22 of suitable form of construction, here shown as a plane plate with a suitable reflecting surface 22′, this plate being supported on a series of brackets or lugs 23 which are so disposed around the interior of the casing 2 as to hold the reflector 22 in an oblique position with respect to the axis of the casing of the headlight. The reflector 22 may be removably held against its supporting lugs or brackets 23 as by a clamp or spring ring 22′.

The plane of the reflector 22 is shown as at an angle of 60° to the axis of the casing 2, and the angle of the reflector member 20 with respect to the axis is about 30°, with the result that all of the light rays coming from the reflector are projected against the face of the reflector 22 and by this in a large proportion directed substantially straight ahead parallel to the axis of the casing 2 and also somewhat downwardly from the axis.

In the present case I have shown the source of illumination as an electric bulb B to which current can be supplied by any suitable source of electricity connected to the lamp by lead wires 25 passed out through the back of the casing as at 26.

It is obvious that the front cover 4 will be provided with a transparent, or if desired translucent, plate as 4ᵃ and which also may be of any desired color.

A further important feature of the invention is the mounting of the casing of the headlight so that it can gravitate and maintain a horizontal position when the vehicle is ascending an inclined plane, and to provide means for preventing the headlight from swinging in the opposite direction when the vehicle is descending a plane, and I therefore, prefer to mount the headlight upon a support on which it can swing on an axis that is substantially transverse and perpendicular to the axis of the casing 2.

A simple form of pivotal support is shown as comprising a pair of diametrically opposite pivot pins 30 the ends of which are threaded at 31 into side lugs or bosses on opposite sides of the casing 2, each pin having a turned part to freely swivel in a journal 32 formed at the upper end of each arm 33 of a fork 34 or other supporting means. This fork or supporting device may be mounted upon any convenient element or part of the vehicle on which the lamp is to be mounted.

With the casing so pivoted it will be seen that the lamp is free to swing to and fro to maintain a substantially horizontal position when the vehicle stands or is running in other than a horizontal position so that when the vehicle is standing or running on an upwardly inclined plane, with respect to the front end of the vehicle, then the rays of the lamp will be cast downwardly on to the foreground instead of being projected upwardly parallel to the inclined plane as would be the case if the headlight were fixed.

To prevent the headlight from casting the rays upwardly by maintaining a horizontal position when the vehicle is running forwardly down an incline plane, a suitable stop is provided to prevent the lower portion of the headlight from passing beyond a given point, and such a device may comprise an adjustable stop member or set screw 35 so positioned as to engage a part of or on the headlight casing 2, and here shown as comprising a depending lug 36 at the lower front portion of the casing.

It is obvious that such stopping device may be located so as to engage with any convenient or desired part of the swinging headlight so long as it will accomplish the purpose of preventing the headlight from swinging beyond a given point when the vehicle is standing heading on a downwardly inclined plane. The lamp organization may be so constructed that it will be overbalanced on one side of its pivot so that the lamp will be caused to swing into contact with the bumper or stop 35, and such overbalancing may be positively secured, if desired, by means of the weight W shown as placed to one side of the transverse medial plane of the casing.

Various changes may be made without departing from the spirit of my invention as claimed.

I claim:

A vehicle headlight including a casing, a hood covering the upper portion of the headlight lens, a lamp in said casing, a reflector in said casing for receiving the rays of light of said lamp and projecting said rays through said lens below said hood, and means for mounting said lamp on an automobile to swing freely on a horizontal axis into substantially a horizontal position when the automobile travels upwardly on an incline, and means for limiting the swinging movement of the lamp to determine the inclination at which the lamp projects its light downwardly when the automobile is traveling on a level or down hill.

In testimony whereof I have signed my name to this specification.

BERT CARLISLE